United States Patent
Zeng et al.

(10) Patent No.: US 12,554,379 B2
(45) Date of Patent: Feb. 17, 2026

(54) METHOD, APPARATUS, DEVICE AND STORAGE MEDIUM FOR DISPLAYING PRIVACY INDICATIONS FOR NAVIGATION TABS

(71) Applicant: Beijing Zitiao Network Technology Co., Ltd., Beijing (CN)

(72) Inventors: Zhizheng Zeng, Beijing (CN); Yuxi Tang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/948,334

(22) Filed: Nov. 14, 2024

(65) Prior Publication Data

US 2025/0068306 A1 Feb. 27, 2025

Related U.S. Application Data

(63) Continuation of application No. PCT/CN2023/128878, filed on Oct. 31, 2023.

(30) Foreign Application Priority Data

Nov. 7, 2022 (CN) .......................... 202211387063.8

(51) Int. Cl.
*G06F 3/0483* (2013.01)
*G06F 3/04817* (2022.01)

(52) U.S. Cl.
CPC ........ *G06F 3/0483* (2013.01); *G06F 3/04817* (2013.01)

(58) Field of Classification Search
CPC .......................... G06F 3/0483; G06F 3/04817
See application file for complete search history.

(56) References Cited

U.S. PATENT DOCUMENTS 6,275,935 B1 * 8/2001 Barlow ............... G06F 21/6209
713/168
6,650,434 B1 * 11/2003 Bruce ..................... B42C 19/02
358/1.18

(Continued)

FOREIGN PATENT DOCUMENTS

CN 102349066 B 7/2015
CN 103403754 B 10/2017

(Continued)

OTHER PUBLICATIONS

Author: Defending Digital Title: Apple Safari Browser Security and Privacy Date: Mar. 28,m 2019 pp. 1-12 (Year: 2019).*

(Continued)

*Primary Examiner* — Irete F Ehichioya
*Assistant Examiner* — Phoebe X Pan
(74) *Attorney, Agent, or Firm* — BakerHostetler

(57) ABSTRACT

The embodiments of the disclosure provide a method, an apparatus, a device and a storage medium for user interaction. The method includes: presenting a page containing a plurality of navigation tabs corresponding to respective information, the plurality of navigation tabs comprising at least a first navigation tab, the first navigation tab corresponding to first information, the first navigation tab being currently unselected, and the page not containing an indication indicating whether the first information has a specific attribute; receiving a user selection of the first navigation tab; and in response to the first information having the specific attribute, presenting the indication associated with the first navigation tab on the page. According to the embodiments of the disclosure, the presentation of corresponding pages can be more facilitated, and thereby improving the user experience.

15 Claims, 13 Drawing Sheets

(56) References Cited

U.S. PATENT DOCUMENTS

| | | | |
|---|---|---|---|
| 7,707,505 B1 | 4/2010 | Ohrt et al. | |
| 8,499,256 B1* | 7/2013 | Iten | H04N 21/47214 715/810 |
| 9,886,160 B2* | 2/2018 | Xian | G06F 3/0483 |
| 10,893,052 B1* | 1/2021 | Bosworth | G06F 21/629 |
| 2006/0248584 A1* | 11/2006 | Kelly | G06F 21/6245 726/18 |
| 2008/0256482 A1 | 10/2008 | Lee et al. | |
| 2008/0295022 A1 | 11/2008 | Valdes et al. | |
| 2010/0318571 A1* | 12/2010 | Pearlman | H04L 63/10 709/204 |
| 2012/0110052 A1* | 5/2012 | Smarr | H04L 67/10 709/201 |
| 2012/0110088 A1* | 5/2012 | Su | H04W 4/21 709/205 |
| 2012/0110474 A1* | 5/2012 | Chen | H04L 67/10 715/753 |
| 2013/0014047 A1 | 1/2013 | Joo et al. | |
| 2013/0014279 A1* | 1/2013 | Leland | G06F 21/6245 726/28 |
| 2014/0298478 A1* | 10/2014 | Kim | G06F 3/0483 726/26 |
| 2015/0052345 A1* | 2/2015 | Martini | H04L 67/02 713/150 |
| 2015/0169154 A1* | 6/2015 | Ainslie | G06F 21/62 715/777 |
| 2015/0356092 A1 | 12/2015 | Kritt et al. | |
| 2017/0364599 A1* | 12/2017 | Ohanyerenwa | G06F 16/48 |
| 2018/0081529 A1* | 3/2018 | Zhang | G06F 3/0482 |
| 2020/0319775 A1 | 10/2020 | Pitelka | |
| 2021/0390470 A1* | 12/2021 | Clearwater | G06Q 10/0635 |

FOREIGN PATENT DOCUMENTS

| | | |
|---|---|---|
| CN | 108846030 A | 11/2018 |
| CN | 112035022 A | 12/2020 |
| CN | 112346612 A | 2/2021 |
| CN | 114173174 A | 3/2022 |
| CN | 114756778 A | 7/2022 |
| CN | 114816147 A | 7/2022 |
| CN | 114819534 A | 7/2022 |
| CN | 115686289 A | 2/2023 |
| JP | 2012-073932 A | 4/2012 |
| JP | 2024-515424 A | 4/2024 |
| WO | WO 2022/179598 A1 | 9/2022 |

OTHER PUBLICATIONS

International Patent Application No. PCT/CN2023/128878; Int'l Search Report; dated Jan. 20, 2024; 2 pages.
The Little Red Book; version v7.59.1; no date; one page.
Kuaisho; "The functionality in Racer"; version 10.8.40.7670; no date; one page.
Japanese Patent Application No. 2024-568185; Office Action dated Jul. 15, 2025, 20 pages with machine translation.
Chinese Patent Application No. 202211387063.8; Office Action dated Jun. 12, 2025, 13 pages with machine translation.
Japanese Patent Application No. 2024-568185 Decision to Grant a Patent dated Oct. 28, 2025, 5 pages with machine translation.

* cited by examiner

METHOD, APPARATUS, DEVICE AND STORAGE MEDIUM FOR DISPLAYING PRIVACY INDICATIONS FOR NAVIGATION TABS

This application is a continuation of International Application No. PCT/CN2023/128878, filed on Oct. 31, 2023, which claims the benefit of Chinese Patent Application No. 202211387063.8, filed on Nov. 7, 2022, and entitled "METHOD, APPARATUS, DEVICE AND STORAGE MEDIUM FOR USER INTERACTION", both of which are incorporated herein by reference in their entireties.

FIELD

Example embodiments of the present disclosure generally relate to the field of computers, and in particular, to methods, apparatuses, devices, and computer-readable storage media for user interaction.

BACKGROUND

In order to facilitate presenting a variety of information displayed on a page to a user in a more concise manner, a plurality of navigation tabs may often be provided in the page. The user selects different navigation tabs to view the information corresponding to the navigation tab. In some applications, considering factors such as privacy of the user, the user may implement privacy settings for some of the navigation tabs, so that the information in the navigation tab can only be viewed by the user or by a designated user.

SUMMARY

In a first aspect of the present disclosure, a method for user interaction is provided. The method comprises: presenting a page containing a plurality of navigation tabs corresponding to respective information, the plurality of navigation tabs comprising at least a first navigation tab, the first navigation tab corresponding to first information, the first navigation tab being currently unselected, and the page not containing an indication indicating whether the first information has a specific attribute; receiving a user selection of the first navigation tab; and in response to the first information having the specific attribute, presenting the indication associated with the first navigation tab on the page.

In a second aspect of the present disclosure, an apparatus for user interaction is provided. The apparatus comprises: a first presentation module configured to present a page, the page containing a plurality of navigation tabs corresponding to respective information, the plurality of navigation tabs comprising at least a first navigation tab, the first navigation tab corresponding to first information, the first navigation tab being currently unselected, and the page not containing an indication indicating whether the first information has a specific attribute; a receiving module configured to receive a user selection of the first navigation tab; and a second presentation module configured to, in response to the first information having the specific attribute, present the indication associated with the first navigation tab on the page.

In a third aspect of the present disclosure, an electronic device is provided. The electronic device comprises at least one processing unit; and at least one memory coupled to the at least one processing unit and storing instructions for execution by the at least one processing unit. The instructions, when executed by the at least one processing unit, cause the electronic device to perform the method of the first aspect.

In a fourth aspect of the present disclosure, a computer-readable storage medium is provided. The computer-readable storage medium has a computer program stored thereon, and the computer program, when executed by a processor, implements the method of the first aspect.

It should be understood that the content described in this summary section is not intended to limit the key features or important features of the embodiments of the present disclosure, nor is it intended to limit the scope of the present disclosure. Other features of the present disclosure will become apparent from the following description.

BRIEF DESCRIPTION OF THE DRAWINGS

The above and other features, advantages, and aspects of various embodiments of the present disclosure will become more apparent from the following detailed description in conjunction with the accompanying drawings. In the drawings, the same or similar reference signs refer to the same or similar elements, in which.

DETAILED DESCRIPTION

Figure 1:
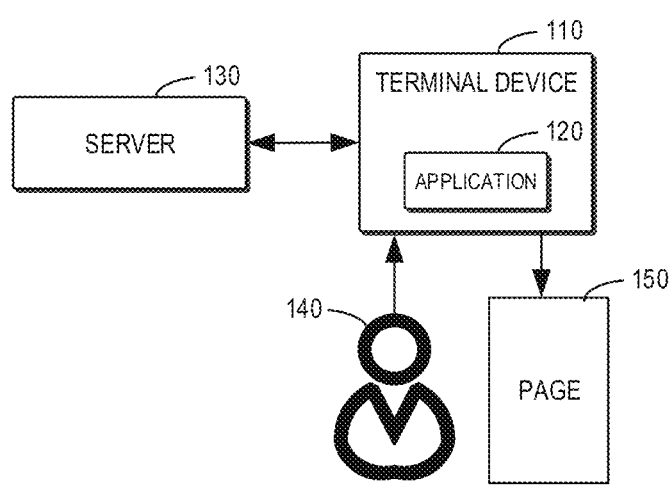
FIG. 1 illustrates a schematic diagram of an example environment in which embodiments of the present disclosure can be implemented.

The embodiments of the present disclosure will be described in more detail below with reference to the accompanying drawings. Although some embodiments of the present disclosure are illustrated in the drawings, it should be understood that the present disclosure can be implemented in various forms and should not be construed as being limited to the embodiments set forth herein. Rather, these embodiments are provided for a more thorough and complete understanding of the present disclosure. It should be understood that the drawings and the embodiments of the present disclosure are provided for illustrative purposes only and are not intended to limit the scope of protection of the present disclosure.

In the description of the embodiments of the present disclosure, the term "including" and the like should be understood as non-exclusive inclusion, that is, "including but not limited to". The term "based on" should be understood as "based at least in part on." The term "an embodiment" or "the embodiment" should be understood as "at least one embodiment". The term "some embodiments" should be understood as "at least some of the embodiments". Other explicit and implicit definitions may also be included below.

Herein, unless explicitly stated, "in response to A" performing a step is not intended that this step is performed immediately after "A", but may include one or more intermediate steps.

It is to be understood that the data involved in the technical solution, including but not limited to the data itself, the obtaining or use of the data, should comply with the requirements of corresponding laws and regulations and relevant provisions.

It is to be understood that, before using the technical solutions disclosed in the various embodiments of the present disclosure, the user shall be informed of the type, the scope of use, and use scenarios and so on of personal information involved in the present disclosure in an appropriate manner in accordance with relevant laws and regulations, and the user's authorization shall be obtained.

For example, in response to receiving an active request from a user, prompt information is sent to the user to explicitly prompt the user that an operation requested by the user will require to obtain and use personal information of the user, so that the user can autonomously select, according to the prompt information, whether to provide the personal information to software or hardware, such as an electronic device, an application program, a server, or a storage medium that performs the operations of the technical solutions of the present disclosure.

As an optional but non-limiting implementation, in response to receiving an active request of the user, the prompt information is sent to the user, for example, in the form of a pop-up window, in which the prompt information may be presented in the form of text. In addition, the pop-up window may further carry a selection control for the user to select "agree" or "not agree" to provide the personal information to the electronic device.

It should be understood that the above process for notifying and obtaining the user's authorization is merely illustrative, and do not limit the implementations of the present disclosure, and other approaches that meet the relevant laws and regulations may also be applied to the implementations of the present disclosure.

FIG. 1 illustrates a schematic diagram of an example environment 100 in which embodiments of the present disclosure can be implemented. In the example environment 100, an application 120 is installed in the terminal device 110. The user 140 may interact with the application 120 via the terminal device 110 and/or an attached device of the terminal device 110. The application 120 may be a social application (for example, a content sharing application), or may be any other suitable application. The application 120 can provide the user 140 with one or more services related to the media content, including creation, posting, browsing, commenting, forwarding, etc. of the media content. As used herein, "media content" includes one or more types of content, such as images, image sets, videos, animated images, audios, texts, and the like.

In the environment 100 of FIG. 1, if the application 120 is active, the terminal device 110 may present a page 150 of the application 120. The page 150 may include various pages that can be provided by the application 120, such as a personal homepage, a detail page of media content, a content creation page, a content posting page, a message page, and so forth. The application 120 may provide content creation functionalities, including shooting, uploading, editing, and/or posting the media content.

In some embodiments, the terminal device 110 communicates with the server 130 to enable provisioning of services to the application 120. The terminal device 110 may be any type of mobile terminal, fixed terminal, or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a positioning device, a television receiver, a radio broadcast receiver, an e-book device, a gaming device, or any combination of the foregoing, including accessories and peripherals of these devices, or any combination thereof. In some embodiments, the terminal device 110 can also support any type of interface for a user (such as, "wearable" circuitry, and so on). The server 130 may be, for example, various types of computing systems/servers capable of providing computing capabilities, including, but not limited to, mainframes, edge computing nodes, computing devices in a cloud environment, and the like.

It should be understood that the structures and functionalities of various elements in the environment 100 are described for illustrative purposes only, and do not imply any limitation to the scope of the present disclosure.

A plurality of pages presented in an application are used to present various information to a user. These pages may be, for example, a personal homepage, a personal work page, a personal relationship page involving the user's social relationships with other users, and the like. In a case where a large amount of information is to be presented on a single page, information is often categorized and presented, so that the user can obtain information in a more concise manner. Categorizing and presenting information often requires setting a plurality of navigation tabs corresponding to different information on a page. The user may obtain the information corresponding to the navigation tab by switching between different navigation tabs.

Figure 2:
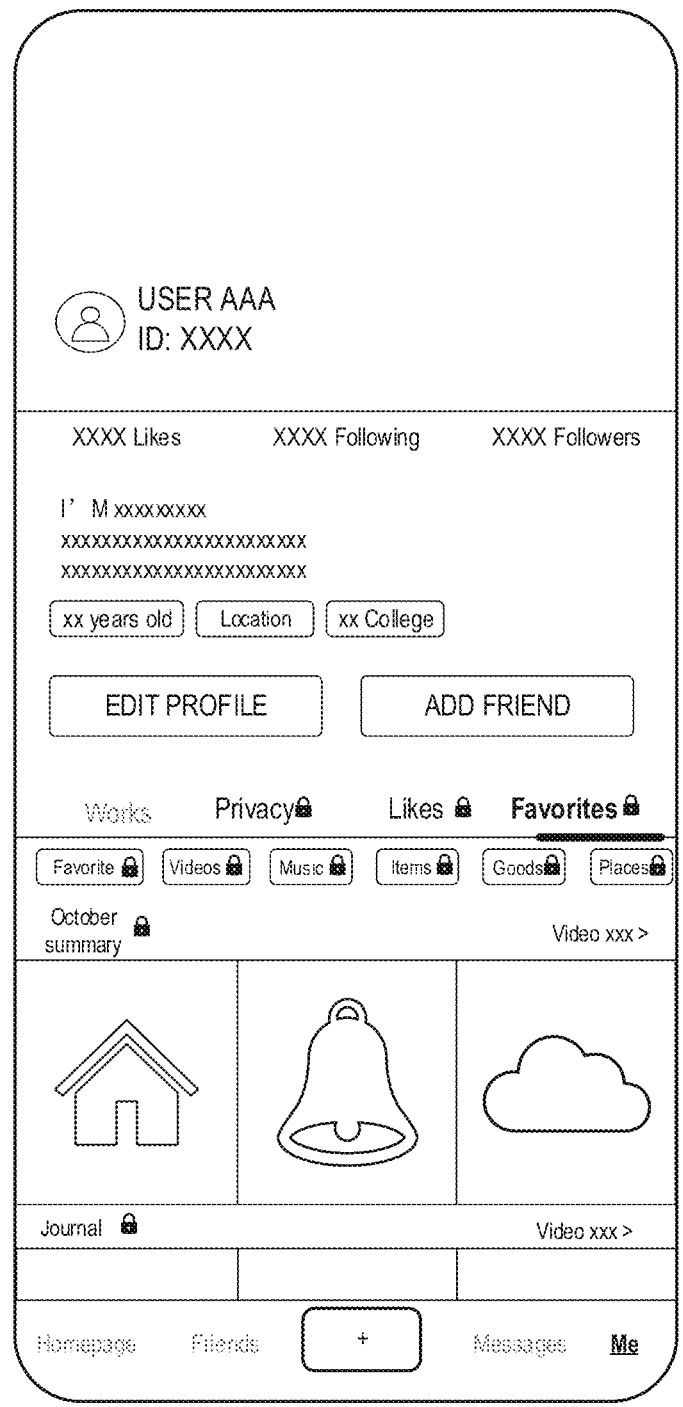
FIG. 2 illustrates a schematic diagram of an example page related to user interaction in a conventional solution.

FIG. 2 illustrates an example of a personal homepage in an application. In the example personal homepage shown in FIG. 2, in addition to some information, such as a user name, personal introduction and the like, a presentation of works related to the user is presented. These works may be classified into a plurality of information categories. For example, the works related to the user includes personally posted or private works, and works of others or of the user that the user likes or favorites. There are numerous works related to the user and involving different categories, in order to clearly present the works under each category, a plurality of navigation tabs, such as "Works", "Private", "Favorites", and "Likes", and so on are included in the page shown in FIG. 2. For example, the navigation tab item "Works" may include various types of media works publicly posted by the user. The navigation tab item "Private" may include various types of media content posted by the user for viewing only by the user. The navigation tab item "Favorites" may include various media content favorited by the user. The navigation tab item "Likes" may include various media content that the user likes. When the user clicks on a corresponding navigation tab to make it become the interactive focus, corresponding media content under that navigation tab item will be presented to the user, and the navigation tab will be highlighted. As shown in FIG. 2, the navigation tab "Favorites" is highlighted, and the navigation tab and respective media content items under that navigation tab item become the interactive focus.

In addition, if there is more information corresponding to a certain navigation tab, a plurality of navigation sub-tabs may be set under the navigation tab to provide a finer categorization and presentation of the information under the navigation tab. For example, FIG. 2 illustrates a plurality of navigation sub-tabs under the navigation tab "Favorites", including "Favorite", "Videos", "Music", "Items" and "Goods". These navigation sub-tabs categorize various types of media content collected by the user. The user only needs to click a corresponding navigation sub-tab to browse the media content corresponding to the navigation sub-tab.

In addition, in order to facilitate browsing and viewing by the user, the media content under each navigation sub-tab item may also be grouped and displayed. For example, as shown in FIG. 2, the media content under a certain navigation sub-tab may be further grouped and displayed, for example, according to information such as shooting time and shooting location of the work, for example, grouped into "October Overview" and "Journal".

The user may set attributes for the information corresponding to each navigation tab item. One way of setting an attribute includes a privacy attribute for indicating whether information corresponding to a navigation tab is publicly visible. In this way, the current user can avoid other users from viewing the information corresponding to the navigation tab.

In some embodiments, for information corresponding to some navigation tabs, such as the navigation tab item "Private" in FIG. 2, the corresponding information may have a privacy attribute, that is, as previously mentioned, the media content under the navigation tab item "Private" can only be viewed by the user himself or herself. For the information under other navigation tab items, if the user does not perform additional attribute settings, some applications will set the media content under these navigation tab items to be displayed publicly by default. In this case, when other users view the user's personal homepage, they can view all media content under the user's navigation tab items "Works", "Favorites" and "Likes".

Some users do not want other users to view, for example, their "Favorites" and "Likes" media content for privacy needs. Some applications enable a user to set the privacy attribute for the information under these navigation tab items, for example, set to be viewed only by the user. In this way, when other users visit the personal homepage of the user, other users do not have access to view the media content under the navigation tab items "Favorites" and "Likes" of the user, thereby protecting the privacy of the user.

In the current applications, if the information under a certain navigation tab item is manually or by default set to have an attribute that is not publicly visible (i.e., a privacy attribute), a corresponding indication (e.g., the graphical interface element of "lock" shown in FIG. 2) is displayed as a private indication on the corresponding navigation tab. In the example of FIG. 2, in addition to the navigation tab "Private", the user also sets the privacy attributes for the media content under the items "Favorites" and "Likes", so that the private indication is presented on the items "Private," "Favorites," and "Likes," and each of navigation sub-tabs under the item "Favorites".

According to the inventors' research and the investigation and statistics on the users, although displaying the private indication on the corresponding navigation tab can identify that the media content under the navigation tab item has a specific attribute, doing so may affect the user experience. As shown in FIG. 2, if the indication of the privacy attribute is presented in a plurality of navigation tabs, the user may have an illusion that all the navigation tabs currently seen are in a private state that cannot be publicly displayed, thereby reducing the user's motivation to browse and explore the personal homepage, which hinders the presentation of the user's personal works, and in turn affects the user experience.

According to the embodiments of the present disclosure, an improved solution for user interaction is provided. In this solution, for a navigation tab corresponding to information with a specific attribute, an identifier or indication indicating the specific attribute is displayed at a specific position only when the navigation tab becomes the interactive focus, and the identifier or indication corresponding to the navigation tab is not displayed when the user does not select the navigation tab. That is, an indication of a specific attribute of an information list may be dynamically presented based on the user's interaction. This can significantly reduce the negative experiences, such as an "oppressive feeling" caused to the user by presenting the indication of the specific attribute on a plurality of navigation tabs, and increase the user's interest in browsing various types of information on a page. According to the embodiments of the present disclosure, the presentation of the corresponding page can be more facilitated, and thereby improving the user experience.

Some example embodiments of the present disclosure will be described below with reference to the accompanying drawings.

Figure 3:
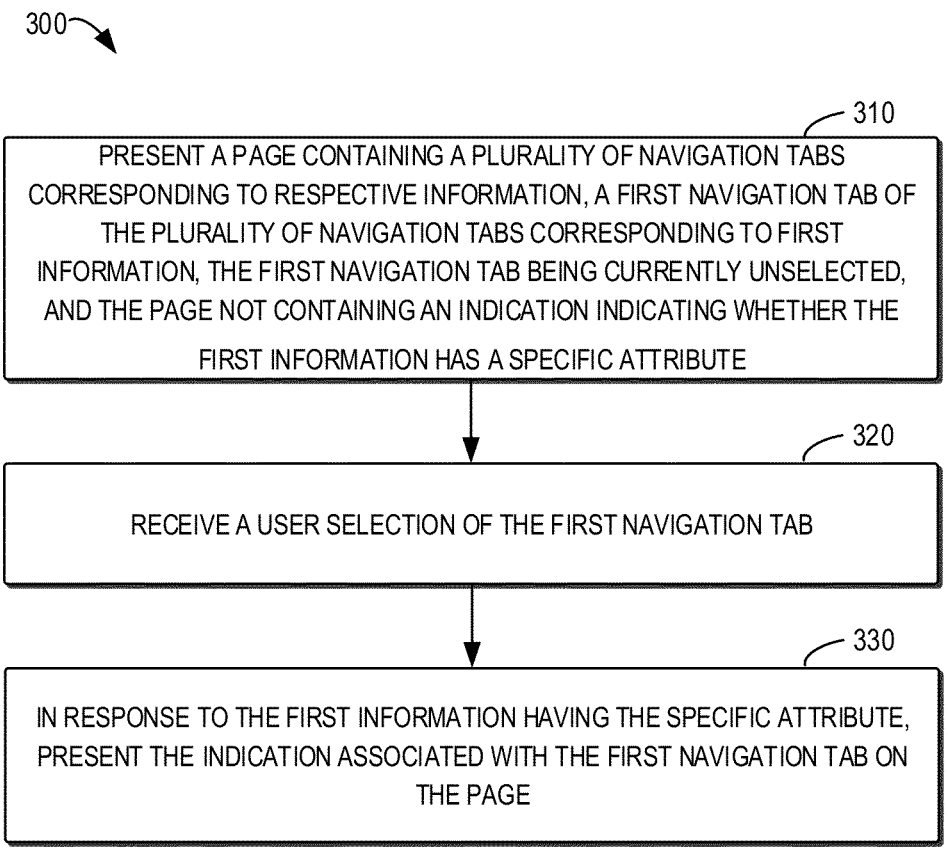
FIG. 3 illustrates a flowchart of a process for user interaction according to some embodiments of the present disclosure.

FIG. 3 illustrates a flowchart of a process 300 for content presentation according to some embodiments of the present disclosure. The process 300 may be implemented at the terminal device 110. For the purpose of discussion, the process 300 will be described with reference to the environment 100 shown in FIG. 1.

At block 310, the terminal device 110 presents a page containing a plurality of navigation tabs corresponding to respective information. The plurality of navigation tabs includes at least a first navigation tab corresponding to first information. The first navigation tab is currently unselected, and the page does not contain an indication indicating whether the first information has a specific attribute.

In some embodiments, the page is a page in an application, which may be a social application, or any other suitable application. The page may be a page that presents a first set of information categories of works related to the user, or a page that presents a second set of information categories of the user's social relationship with other users, or any other suitable page that involves a plurality of information categories and a corresponding plurality of navigation tabs 410.

The plurality of information categories on the page may be divided by any suitable classification criteria and each information category is navigated and presented with a particular navigation tab. As will be discussed below, such information categories may include one or more information categories related to the media content, one or more information categories related to social relationships of the user with other users, and the like. Of course, the information categories corresponding to the plurality of navigation tabs on the current page may be across different information types, for example, an information category for mixed presentation of the media content and the user's social relationship. Although the following takes the media content and the user's social relationship as examples for illustration, it is to be understood that the embodiments of the present disclosure may be similarly applied to any other information category that may be presented on the page.

In some embodiments, a specific attribute may include an attribute indicating that information in a particular information category is not publicly visible, also referred to as a privacy attribute. The privacy attribute indicates that the corresponding information is not publicly visible. In some embodiments, the specific attribute of interest may include an attribute indicating that the information is publicly visible, i.e., dynamically presenting the indication of information that is publicly visible. Of course, it should be understood that the specific attribute may also be any other suitable attribute about information. In the following, the concept of the present disclosure will be described primarily in terms of the example of the specific attribute being the privacy attribute for which the information is not publicly visible. It should be understood that the situation is similar for the case where the specific attribute is any other attribute, thus which will not be repeated separately below.

During the presentation of the page, the user device 110 detects the user's input on the navigation tab and various other content. If the user clicks the previously mentioned first navigation tab that is unselected, the first navigation tab will become the interactive focus. At block 320, the terminal device 110 may receive a user selection of the first navigation tab. At block 330, in response to first information corresponding to the first navigation tab having a specific attribute, the terminal device 110 will present an indication associated with the first navigation tab on the page.

Note that in a plurality of navigation tabs on a page, there may be one or more navigation tabs with the specific attribute, for each of such navigation tabs, the process described above may be used to determine how an indication of a specific attribute is presented.

According to the improved solution of the embodiments of the present disclosure, the indication associated with the navigation tab is presented on the page, only when the navigation tab corresponding to the information with the specific attribute is selected as the interactive focus. When the user does not select the navigation tab, the indication associated with the navigation tab is not displayed. In this way, the oppression to the user caused by presenting the indication of the specific attribute on a plurality of navigation tabs can be significantly reduced, and the user experience can be significantly improved.

In some embodiments, the indication may include presenting a graphical interface element of a predetermined shape on the first navigation tab or within a predetermined neighborhood. For example, the predetermined shape may be a graphical interface element having a lock pattern. In some embodiments, alternatively or additionally, the indication may also present a textual description of the indication at a predetermined location on the interface. These will be further described below in connection with the accompanying drawings.

Figure 4A:
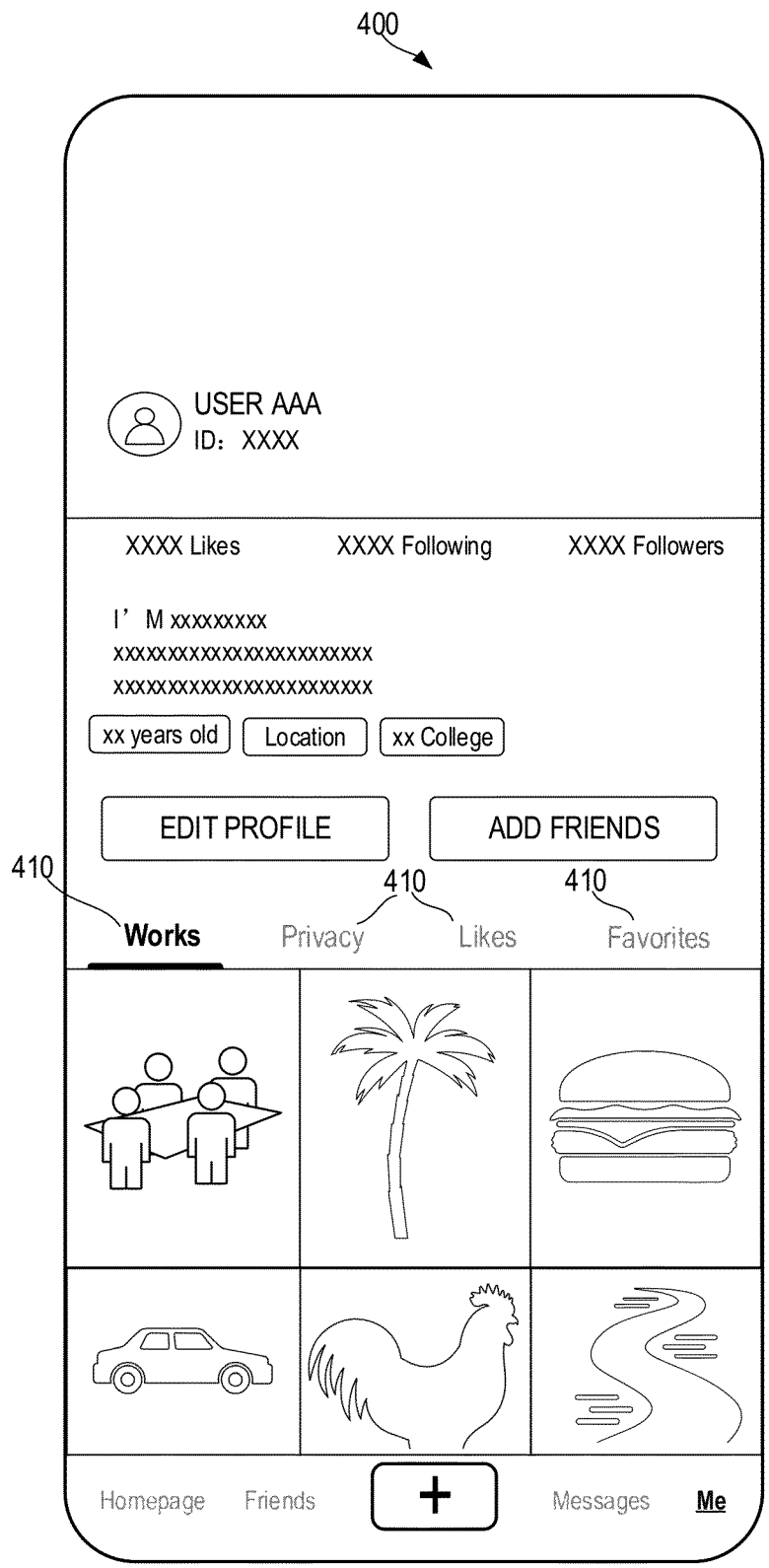
FIG. 4A to FIG. 4I illustrate schematic diagrams of example pages related to user interaction according to some embodiments of the present disclosure.

As an example, FIG. 4A illustrates an example content presentation page 400 of the application 120. The page 400 shown in FIG. 4A is a page of a personal homepage. It can be seen that, in addition to displaying information such as a user profile, a user name, and a personal introduction, the page includes a plurality of navigation tabs. The information corresponding to these navigation tabs may relate to a first set of information categories associated with media content, respectively. The first set of information categories may include at least one of the following information categories: media content posted by the user, media content favorited by the user, and media content that the user likes, but may not be limited thereto. As shown in the figure, the navigation tab 410 corresponding to the work posted by the user is the "Works" navigation tab 410 and the "Private" navigation tab 410, the navigation tab 410 corresponding to the media content favorited by the user is the "Favorites" navigation tab 410, and the media content that the user likes is the "Likes" navigation tab 410. The page shown in FIG. 4A presents a page of the media content under the "Works" navigation tab 410 (i.e., the "Works" navigation tab 410 is the interactive focus).

The media content corresponding to the "Private" navigation tab 410 belongs to the media content that is not published by the user and can only be viewed by the user, that is, the corresponding information itself has the privacy attribute. As an example, for the navigation tabs 410 other than the "Works" navigation tab 410 included in the personal homepage page, i.e., "Favorites" and "Likes" navigation tabs 410, the user may also set the privacy attribute of the information corresponding to those items. In the following, the concept of the present disclosure will be described mainly in an example of the information corresponding to the "Private", "Favorites" and "Likes" navigation tabs 410 having the privacy attribute.

As can be seen from FIG. 4A, although the information corresponding to "Private," "Favorites," and "Likes" navigation tabs 410 has the privacy attribute, when the user browses the "Works" navigation tab 410, there is no indication 430 indicating whether the "Private," "Favorites," and "Likes" navigation tabs 410 have the privacy attribute presented on the page. In this case, the "Private", "Favorites" and "Likes" navigation tabs 410 are the first navigation tab 410 that is unselected as mentioned above.

Figure 4B:
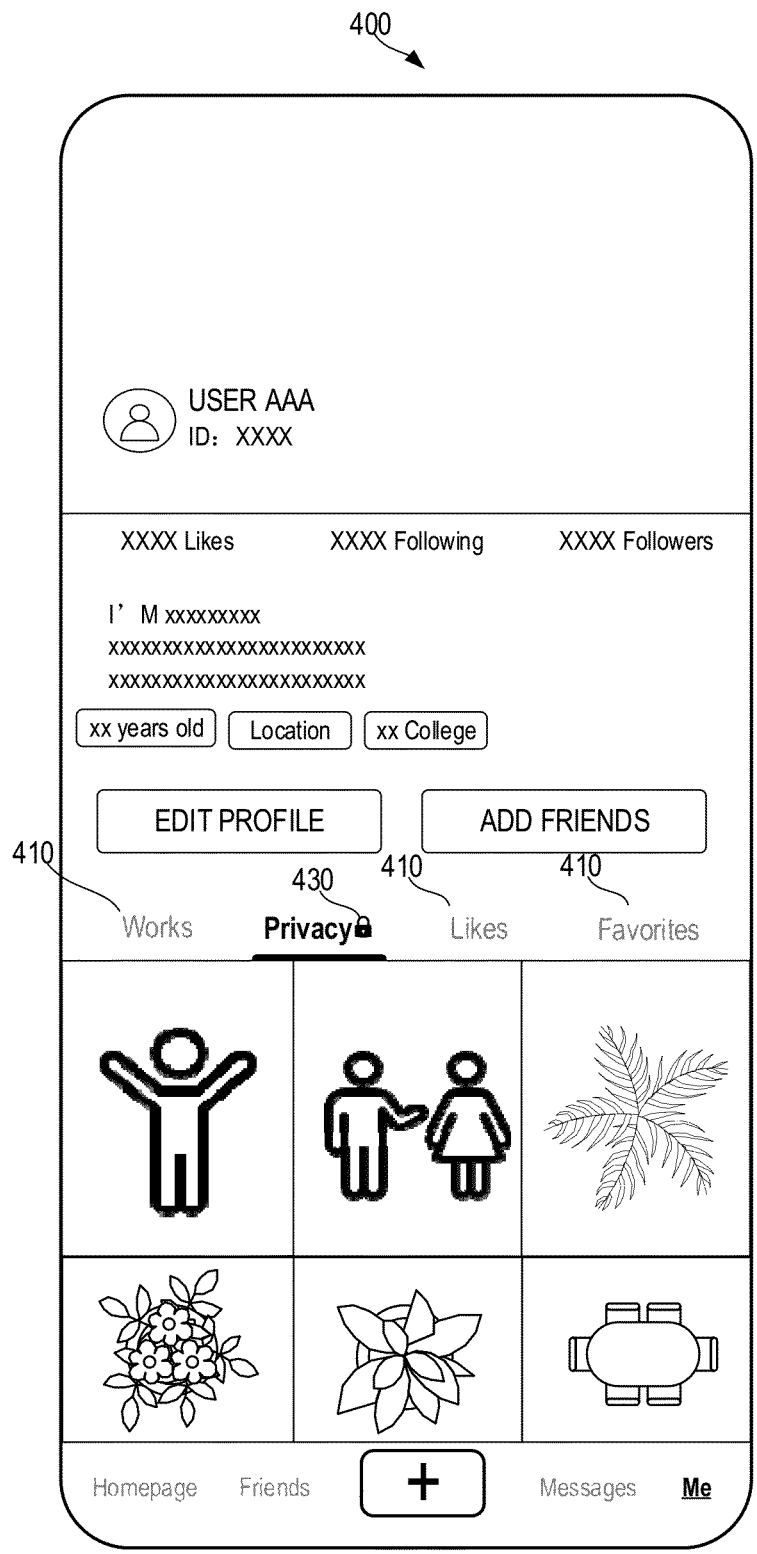
Figure 4C:
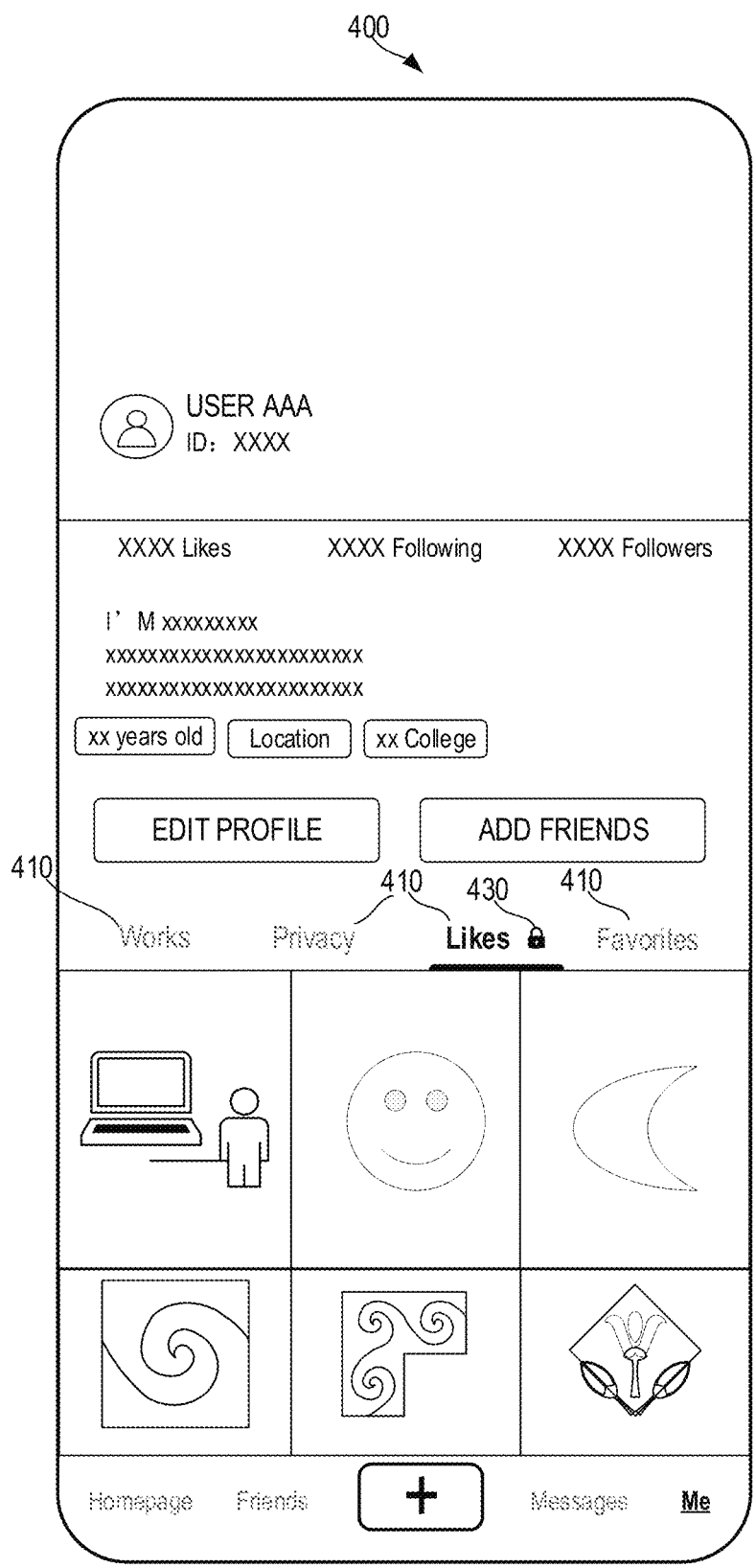
Figure 4D:
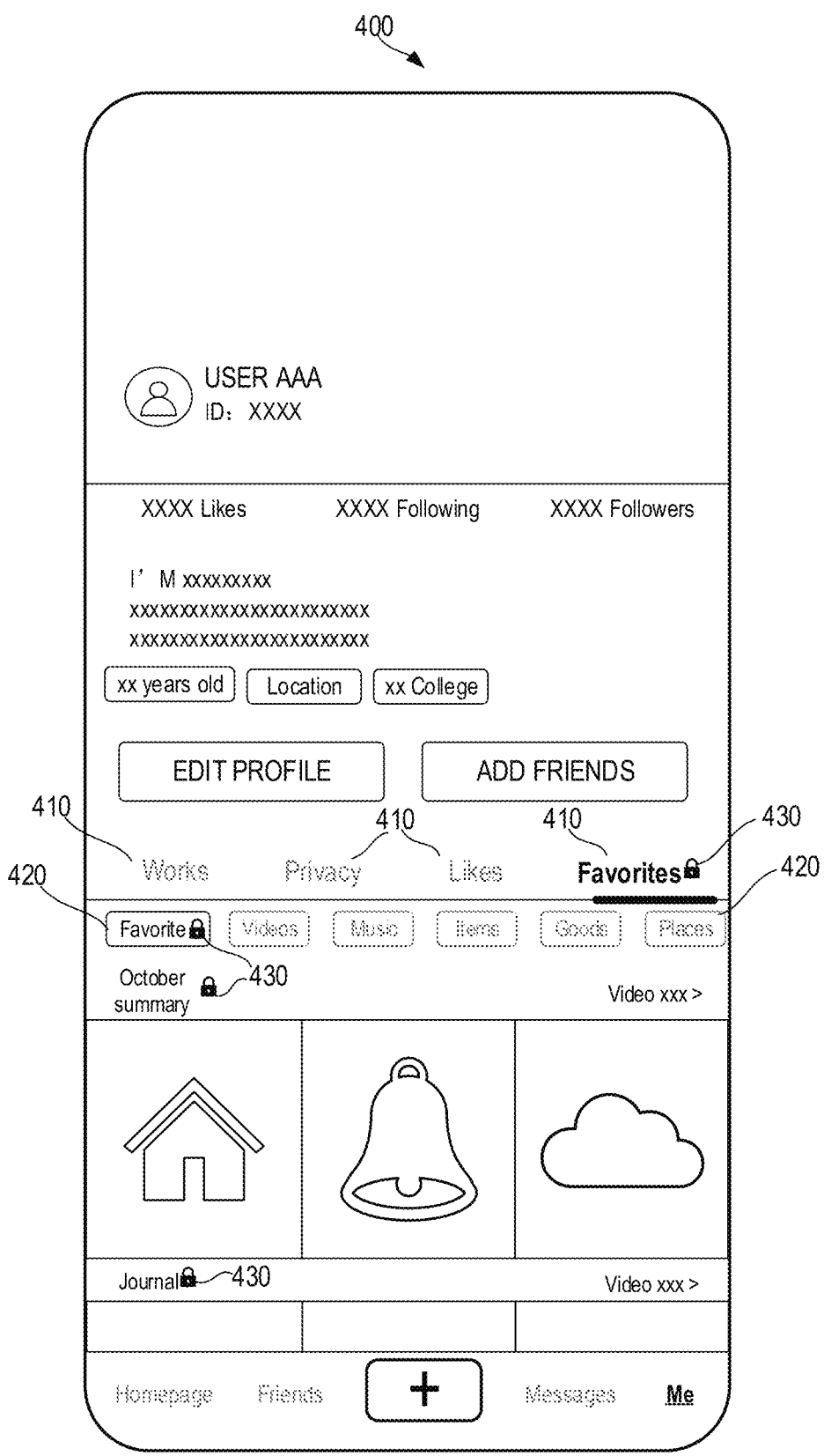

FIGS. 4B to 4D illustrate pages when the "Private," "Favorites," and "Likes" navigation tabs 410 are respectively selected to become the interactive focus. As illustrated in FIG. 4B, after the user selects the "Private" navigation tab 410, as the "Private" navigation tab 410 has the privacy attribute, the indication 430 for indicating the privacy attribute associated with the navigation tab 410 is presented on the page 400, for example, a graphical interface element with a lock pattern.

Similarly, as illustrated in FIGS. 4C and 4D, after the user selects the "Likes" or "Favorites" navigation tabs 410, as the information corresponding to the "Likes" or "Favorites" navigation tabs 410 has been set with the privacy attribute, the indication 430 associated with the navigation tab 410 for indicating the privacy attribute is presented on the corresponding navigation tab 410, for example, the graphical interface element with the lock pattern is presented.

As can also be seen from the example process of switching the navigation tabs 410 by the user illustrated in FIGS. 4B to 4D, in some embodiments, if the user switches from the "Private" navigation tab 410 that has the privacy attribute to another navigation tab 410, for example, to "Likes" or "Favorites" navigation tab 410, the indication 430 regarding the privacy attribute associated with the "Private" navigation tab 410 will cease to be presented, that is, the indication 430 regarding the privacy attribute associated with the navigation tab 410 that is not the interactive focus will not be presented.

In other words, in some embodiments, according to the method provided by the embodiments of the present disclosure, the terminal device 110, in response to receiving a user selection of a second navigation tab 410 (e.g., the "Likes" or "Favorites" navigation tab 410 after the switching as mentioned above) in the plurality of navigation tabs 410, ceases to present the indication 430 regarding the privacy attribute associated with the first navigation tab 410 (e.g., the "Private" navigation tab 410 before the switching as mentioned above) on the page.

In addition, in some embodiments, some navigation tabs 410 may include a plurality of navigation sub-tabs 420 to further categorize the media content corresponding to the navigation tab 410. For example, in the example shown in FIG. 4D, the "Favorites" navigation sub-tab 420 may further include a plurality of navigation sub-tabs 420, for example, including "Favorite", "Videos" "Music", "Items", "Goods", and "Places" navigation sub-tabs 420. For example, the "Favorite" navigation sub-tab 420 corresponds to all content under the "Favorites" navigation tab 410, the "Videos" navigation sub-tab 420 corresponds to all video-type media content favorited by the user, the "Music" navigation sub-tab 420 corresponds to all the music-type media content favorited by the user, the "Items" navigation sub-tab 420 corresponds to all item-type media content favorited by the user, the "Goods" navigation sub-tab 420 corresponds to all the goods favorited by the user, and the "Places" navigation sub-tab 420 corresponds to the media content that relates to all places favorited by the user.

For a plurality of navigation sub-tabs 420, in a case where the navigation tab 410 to which they belong have the specific attribute, these navigation sub-tabs 420 may also have the same specific attribute by default. For example, in the example shown in FIG. 4D, all navigation sub-tabs under the "Favorites" navigation tab 410 may also have the privacy attribute.

Of course, in some embodiments, the user may also separately set the attribute of the information corresponding to the navigation sub-tabs 420 under the navigation tab 410 item that has the specific attribute, for example, setting the attribute of the information corresponding to some of the navigation sub-tabs 420 as public. In this case, for cases where the information corresponding to the navigation sub-tabs 420 included in the navigation tab 410 does not have the same attribute, different indications 430 (for example, a half-locked pattern, etc.) may be presented on the navigation tab 410 to indicate that the information corresponding to the navigation sub-tabs 420 under the navigation tab 410 has different attributes (for example, some have a privacy attribute, and some have a public attribute). The concept of the present disclosure will be described herein mainly in an example of all the navigation sub-tabs 420 under the navigation tab 410 item having the same specific attribute, and similarly for other cases, which will not be repeatedly described hereinafter.

In some embodiments, in response to receiving the user selection of the first navigation tab 410 having a plurality of navigation sub-tabs 420 and determining that the first information corresponding to the first navigation tab 410 has the specific attribute, the terminal device 110 only presents the indication 430 associated with the currently selected navigation sub-tab 420 of the plurality of navigation sub-tabs 420. Corresponding to the example shown in FIG. 4D, when the "Favorites" navigation tab 410 that has the plurality of navigation sub-tabs 420 is selected, only the indication 430 indicating the privacy attribute associated with the currently selected navigation sub-tab 420 (i.e., the "Favorite" navigation sub-tab 420) in the plurality of navigation sub-tabs 420 is presented, while the indications associated with other navigation sub-tabs that are unselected are not presented. In this way, user privacy can be protected without affecting the user's motivation to explore related pages, thereby improving the user experience.

Accordingly, a plurality of further subdivided groups in the "Favorites" navigation sub-tab 420 (e.g., "October Summary" or "Journal", etc. illustrated in FIG. 4D) may also present the privacy attribute indication 430 associated with the group name at a suitable location, as illustrated in FIG. 4D.

Figure 4E:
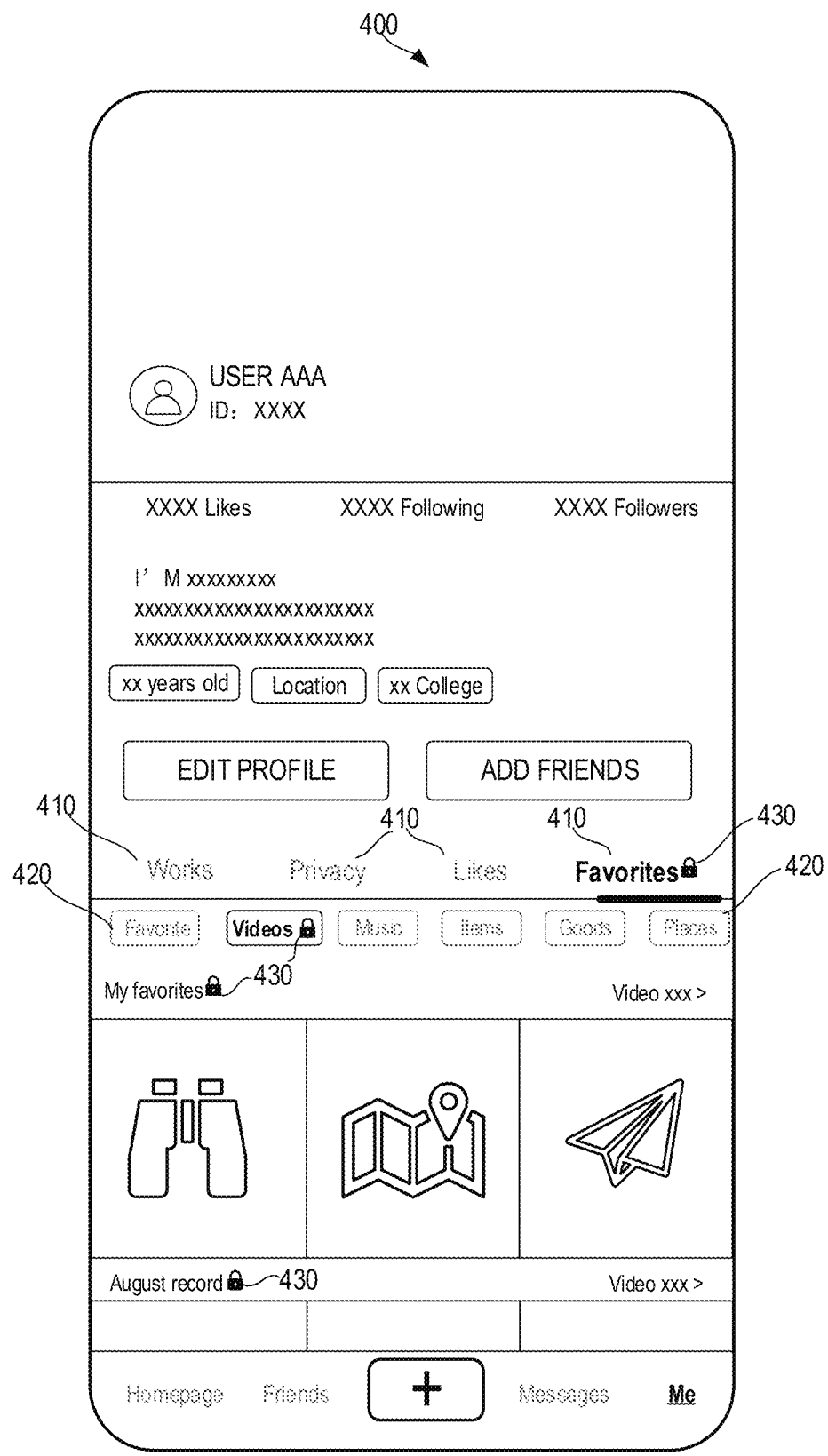

After the user switches from the "Favorite" navigation sub-tab 420 under the "Favorites" navigation tab 410 to the "Videos" navigation sub-tab 420, the indication of the privacy attribute associated with the "Favorite" navigation sub-tab 420 will cease to be displayed, thereby displaying the indication 430 of the privacy attribute corresponding to the "Videos" navigation sub-tab 420, as illustrated in FIG. 4E.

An example in which the indication 430 indicating the specific attribute presented on the navigation tab 410 on the page is a lock pattern is shown above with reference to FIGS. 4A to 4E, in some embodiments, the indication 430 may also be presented in other forms at any other suitable location on the page. For example, in some embodiments, as previously mentioned, the indication 430 for indicating the privacy attribute associated with the navigation tab 410 may also include a graphical interface element that presents a predetermined shape within the neighboring region of the navigation tab 410.

Alternatively, or additionally, in some embodiments, the indication 430 associated with the first navigation tab 410 that indicates the specific attribute may also include presenting a textual description of indication 430 at a predetermined location on the interface.

Figure 4F:
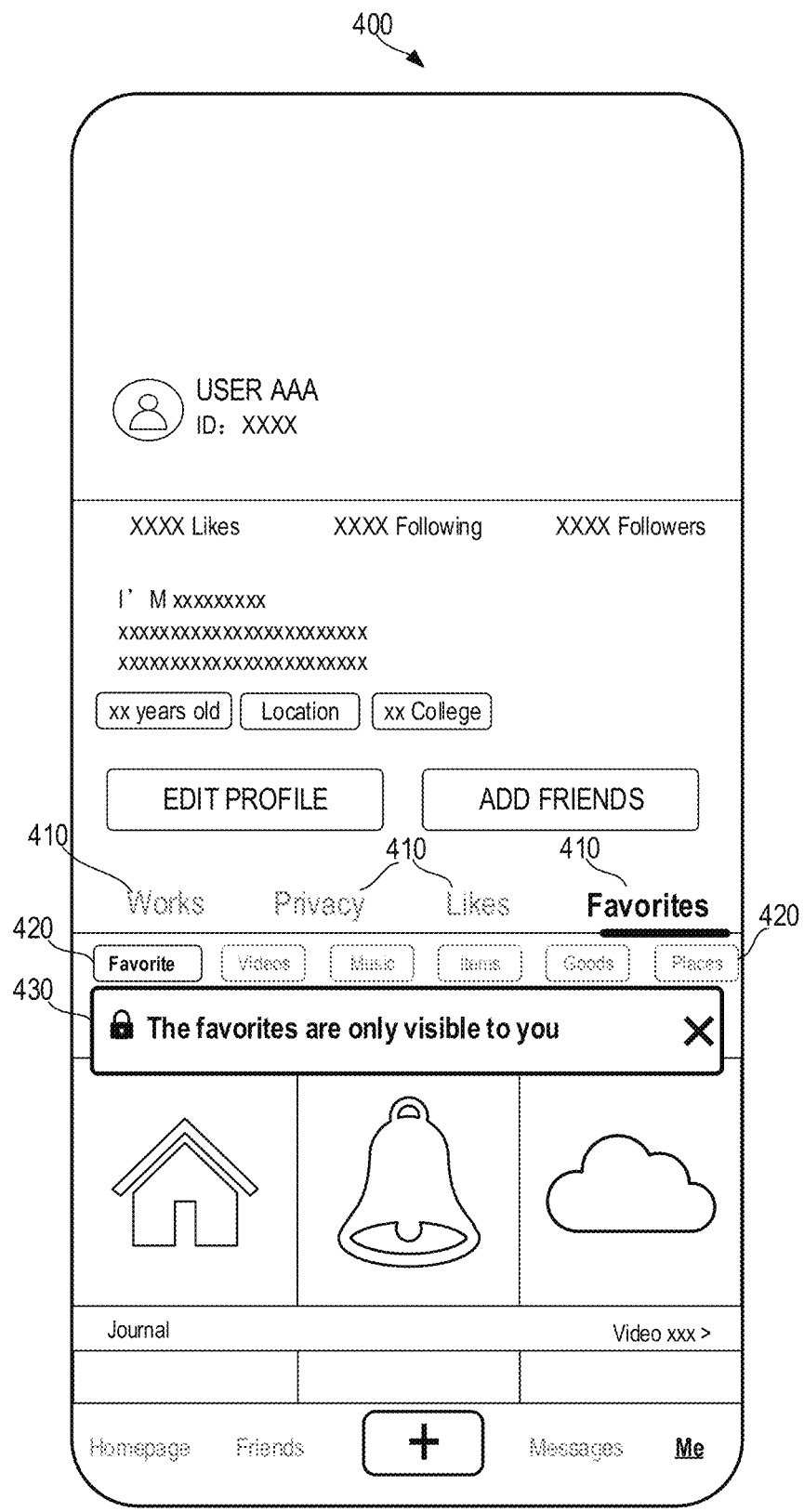
Figure 4G:
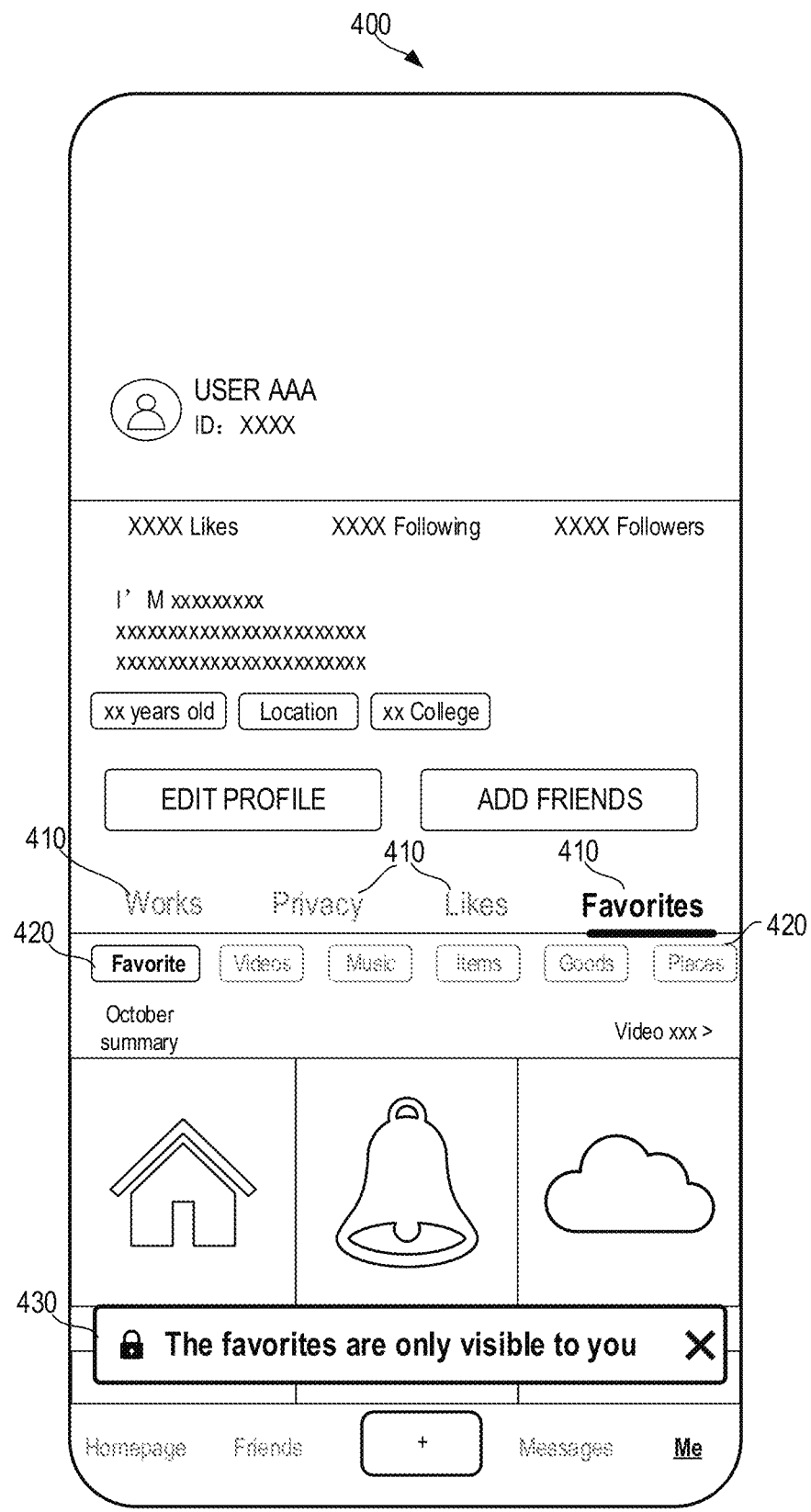

For example, FIG. 4F illustrates an indication 430 presented within a neighboring region below the "Favorites" navigation tab 410. In addition to the lock pattern, the indication 430 further includes interpretive text for more clearly indicating the specific attribute of the information corresponding to the current navigation tab 410. FIG. 4G illustrates an indication 430 presented within an area near the bottom below the "Favorites" navigation tab 410. In addition to the lock pattern, the indication 430 further includes interpretive text for more clearly indicating the specific attribute of the information corresponding to the current navigation tab 410.

In some embodiments, to avoid the indication 430 from obscuring the media content, a graphical interface element indicating closing the indication 430, such as a "close" pattern, may be presented on the indication 430 illustrated in FIGS. 4F and 4G, such that the user closes the indication 430 by clicking on the "close" pattern. Of course, in some embodiments, after the user closes the indication 430, the graphical interface element indicating the privacy attribute may continue to be displayed on the corresponding navigation tab 410 or any other suitable location. In addition, in some alternative embodiments, the indication 430 tag illustrated in FIG. 4F and FIG. 4G may also be hidden after a predetermined time of presentation, and then the graphical interface element indicating the privacy attribute is displayed on the corresponding navigation tab 410 to avoid the indication 430 tag from obscuring the media content.

The presentation of the indication 430 indicating the privacy attribute in a plurality of navigation tabs 410 of a plurality of information categories related to media content is described above in connection with FIGS. 4A to 4G. In some embodiments, the information corresponding to the plurality of navigation tabs on the page may respectively relate to a second set of information categories of the social relationship between the user and other users. In the following, such a page is also be referred to as a personal relationship page. The second set of information categories related to the social relationship between the user and other users may include at least one of the following information categories: a following of the user, a follower of the user, a friend of the user, but may not be limited thereto. For example, the followings of the user refer to other users followed by the user and not follow the user, the followers of the user refer to other users who follow the user but the user does not follow, and the friends of the user refer to other users and the user are mutual following.

Similar to the example of the personal homepage mentioned above, in order to protect privacy, the user may set the privacy attribute for information corresponding to "Friends" and "Following" tabs, respectively. For example, in this example, it is assumed that the user sets the privacy attribute for information corresponding to "Friends" and "Following" tabs, but does not allow other users to view information corresponding to the information.

Figure 4H:
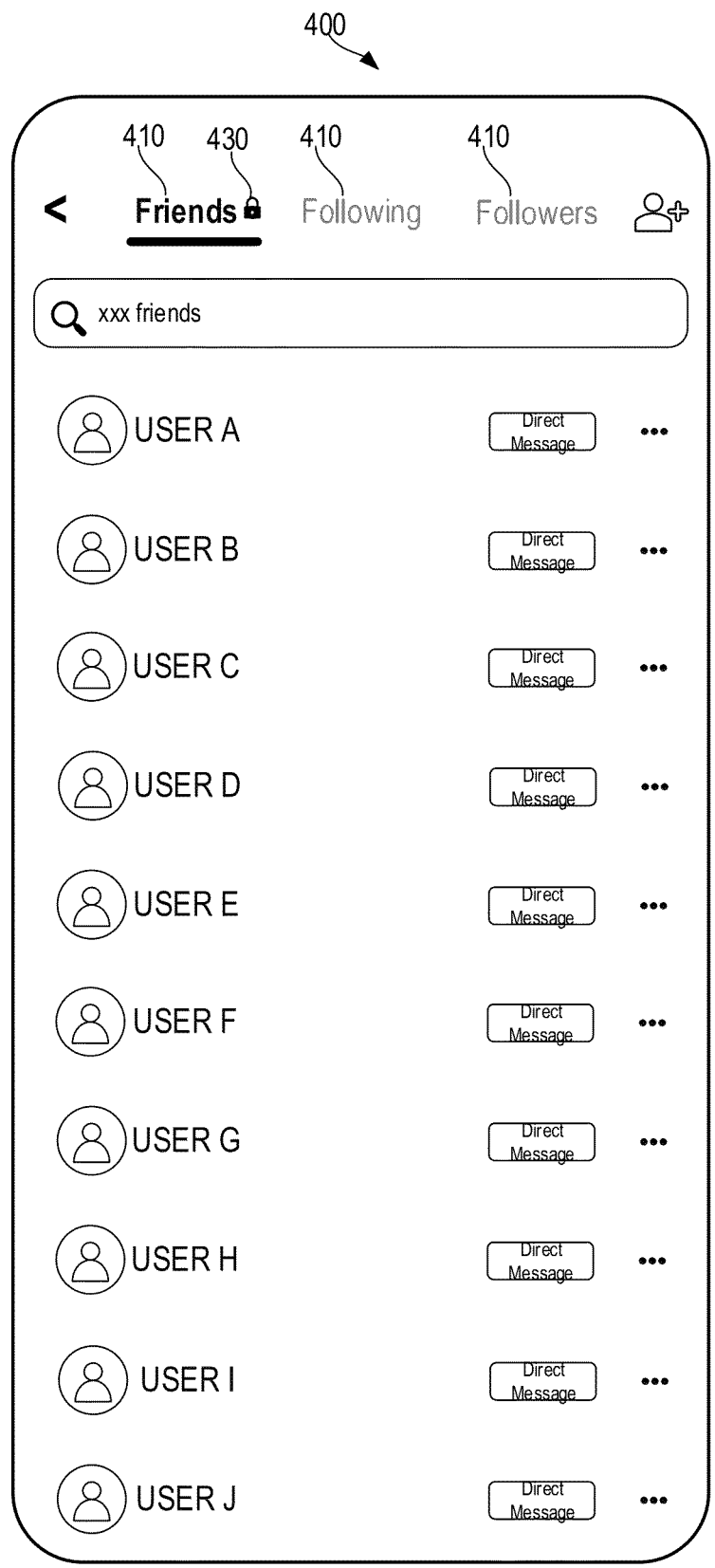
Figure 4I:
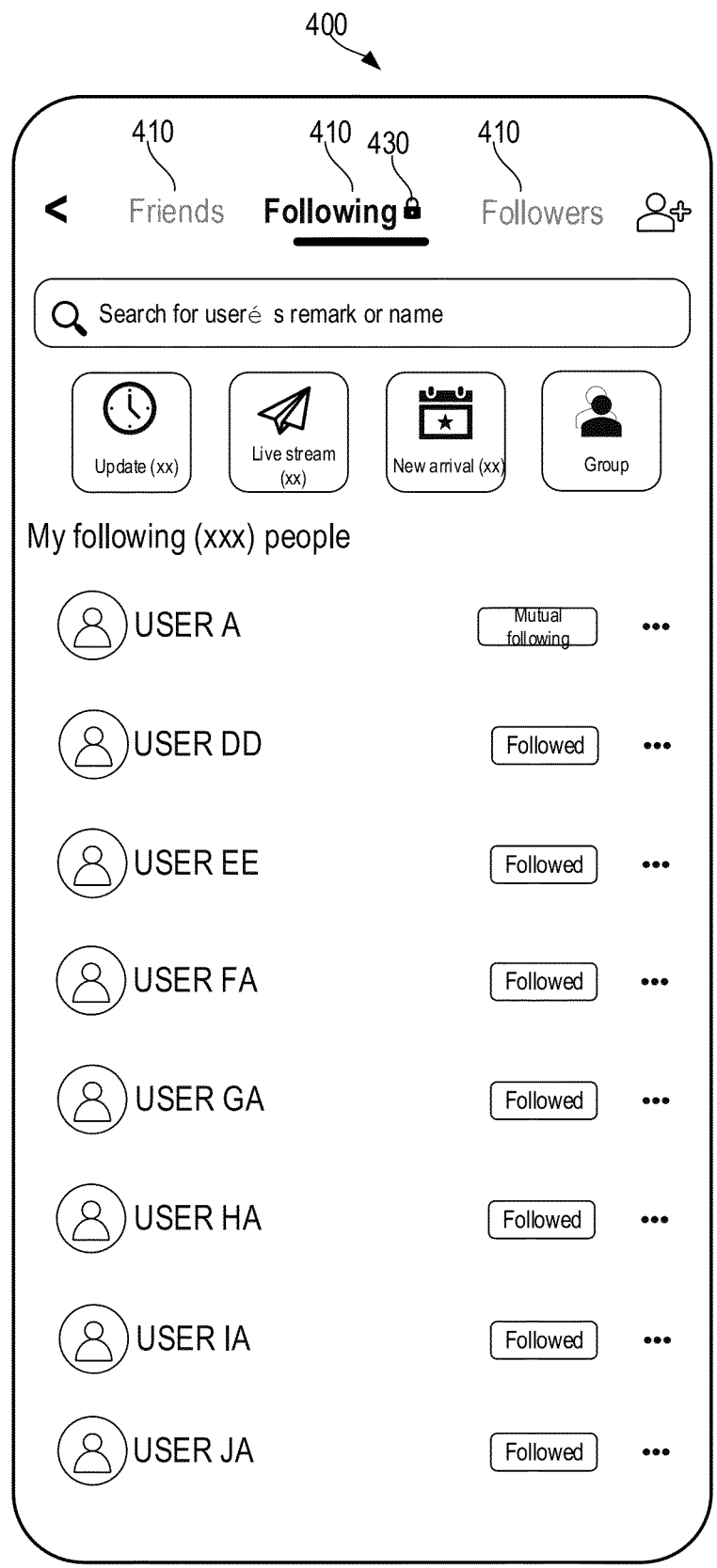

As shown in FIG. 4H, when the "Follow" navigation tab 410 is unselected, the indication 430 indicating that the information corresponding to the navigation tab 410 has a hidden attribute is not presented on the page. The "Friend" navigation tab 410 is in a selected state, at which point the indication 430 indicating that the information corresponding to the navigation tab 410 has a hidden attribute is also presented on the page, for example, a lock pattern on the navigation tab 410. After the user selects the "Follow" navigation tab 410, the indication 430 indicating that the information corresponding to the tag has a hidden attribute is presented on the "Follow" navigation tab 410 on the page accordingly, while ceasing the presentation of the hidden attribute indication 430 associated therewith on the "Friend" navigation tab 410, as shown in FIG. 4I. In this way, the user's privacy can be protected while the user experience is not affected on the personal relationship page.

It should be understood that, in addition to a lock graphical interface element, specific attributes of some information may be indicated in other ways (e.g., the prompt described in the text of FIGS. 4F to 4G) in a page involving social relationships between a user and other users. Details will not be repeated herein.

Figure 5:
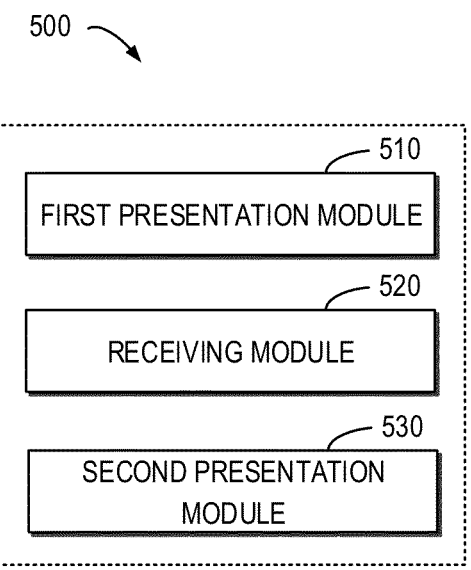
FIG. 5 illustrates a block diagram of an apparatus for user interaction according to some embodiments of the present disclosure.

FIG. 5 illustrates a schematic structural block diagram of an apparatus 500 for content presentation according to some embodiments of the present disclosure. The apparatus 500 may be implemented or included in the terminal device 110. The various modules/components in the apparatus 500 may be implemented by hardware, software, firmware, or any combination thereof.

The apparatus 500 comprises a first presentation module 510 configured to present a page containing a plurality of navigation tabs 410 respectively corresponding to respective information, the plurality of navigation tabs 410 comprising a first navigation tab 410 corresponding to first information, the first navigation tab 410 being currently unselected, and the page not containing an indication 430 indicating whether the first information has a specific attribute. The apparatus 500 further comprises a receiving module 520 configured to receive a user selection of the first navigation tab 410. The apparatus 500 further comprises a second presentation module 530 configured to, in response to determining that the first information has the specific attribute, present the indication 430 associated with the first navigation tab 410 on the page.

In some embodiments, the apparatus 500 further comprises a ceasing presentation module configured to, in response to receiving a user selection of a second navigation tab of the plurality of navigation tabs 410, cease to present the indication 430 associated with the first navigation tab 410 on the page.

In some embodiments, the information corresponding to the plurality of navigation tabs respectively relates to a first set of information categories associated with media content.

In some embodiments, the first set of information categories comprises at least one of the following information categories: media content posted by a user, media content that the user likes, and media content favorited by the user.

In some embodiments, the information corresponding to the plurality of navigation tabs respectively relates to a second set of information categories of social relationships between a user and other users.

In some embodiments, the second set of information categories comprises at least one of the following information categories: a following of the user, a follower of the user, a friend of the user.

In some embodiments, the specific attribute comprises an attribute indicating whether the first information is publicly visible.

In some embodiments, presenting the indication 430 associated with the first navigation tab on the page comprises: presenting a graphical interface element of a predetermined shape on the first navigation tab 410 or within a predetermined neighborhood.

In some embodiments, presenting the indication 430 associated with the first navigation tab on the page comprises: presenting a textual description of the indication at a predetermined location on the page.

In some embodiments, the first navigation tab 410 has a plurality of navigation sub-tabs 420, and the apparatus 500 further comprises a third presentation module configured to, in response to receiving the user selection of the first navigation tab 410 and determining that the first information has the specific attribute, present only the indication 430 associated with a currently selected navigation sub-tab 420 of the plurality of navigation sub-tabs 420.

Figure 6:
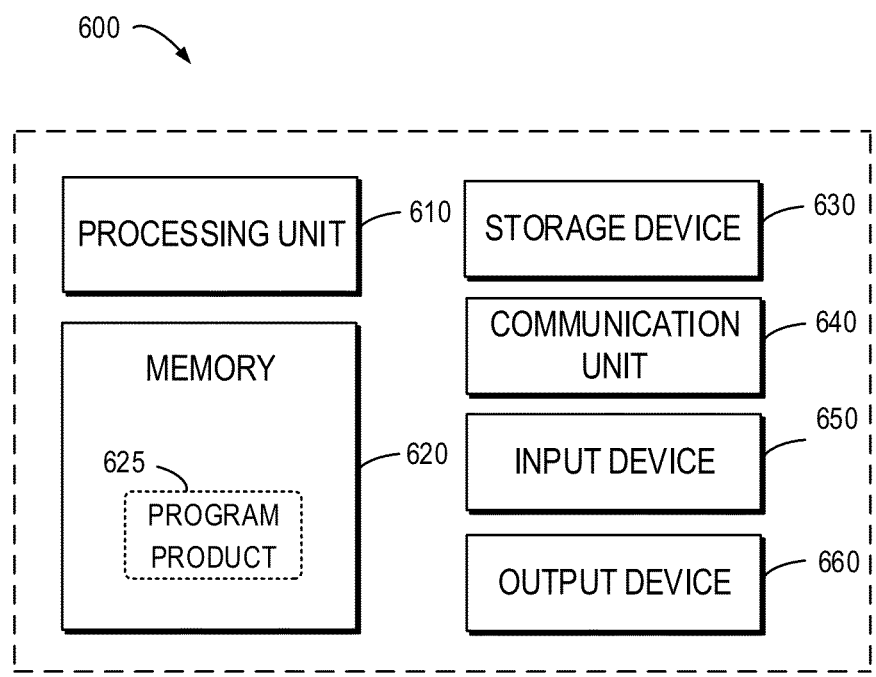
FIG. 6 illustrates an electronic device in which one or more embodiments of the present disclosure may be implemented.

FIG. 6 illustrates a block diagram of an electronic device 600 in which one or more embodiments of the present disclosure may be implemented. It should be understood that the electronic device 600 in FIG. 6 is shown for merely illustrative purpose, and should not limit the functionality and scope of the embodiments described herein. The electronic device 600 shown in FIG. 6 may be configured to implement the terminal device 110 in FIG. 1.

As shown in FIG. 6, the electronic device 600 is in the form of a general-purpose computing device. Components of the electronic device 600 may include, but are not limited to, one or more processors or processing units 610, a memory 620, a storage device 630, one or more communications units 640, one or more input devices 650, and one or more output devices 660. The processing unit 610 may be a physical or virtual processor and can perform various processing according to a program stored in the memory 620. In a multiprocessor system, a plurality of processing units execute computer executable instructions in parallel, so as to improve the parallel processing capability of the electronic device 600.

The electronic device 600 typically includes a plurality of computer storage medium. Such media may be any available media that are accessible by the electronic device 600, including, but not limited to, volatile and non-volatile media, removable and non-removable media. The memory 620 may be a volatile memory (e.g., a register, cache, random access memory (RAM)), non-volatile memory (e.g., read-only memory (ROM), electrically erasable programmable read-only memory (EEPROM), flash memory), or some combination thereof. The storage device 630 may be a removable or non-removable medium and may include a machine-readable medium, such as a flash drive, a magnetic disk, or any other medium that can be used to store information and/or data (e. g., training data for training) and that can be accessed within the electronic device 600.

The electronic device 600 may further include additional detachable/undetachable, volatile/nonvolatile storage medium. Although not shown in FIG. 6, a magnetic disk drive for reading from or writing to a detachable, nonvolatile magnetic disk, such as a "floppy disk" and an optical disk drive for reading from or writing to a detachable, nonvolatile optical disk may be provided. In these cases, each drive may be connected to a bus (not shown) by one or more data media interfaces. The memory 620 may include a computer program product 625 having one or more program modules configured to perform various methods or actions of various embodiments of the present disclosure.

The communication unit 640 implements communication with other electronic devices through a communication medium. Additionally, functions of components of the electronic device 600 may be implemented by a single computing cluster or a plurality of computing machines, and these computing machines can communicate through a communication connection. Thus, the electronic device 600 may operate in a networked environment using logical connections to one or more other servers, network personal computers (PCs), or another network node.

The input device 650 may be one or more input devices, such as a mouse, a keyboard, a trackball, etc. The output device 660 may be one or more output devices, such as a display, a speaker, a printer, etc. The electronic device 600 may also communicate with one or more external devices (not shown), such as a storage device, a display device, or the like through the communication unit 640 as desired, and communicate with one or more devices that enable a user to interact with the electronic device 600, or communicate with any device (e.g., a network card, a modem, or the like) that enables the electronic device 600 to communicate with one or more other electronic devices. Such communication may be performed via an input/output (I/O) interface (not shown).

According to an example implementation of the present disclosure, a computer readable storage medium is provided, on which computer-executable instructions is stored, wherein the computer-executable instructions are executed by a processor to implement the method described above. According to an example implementation of the present disclosure, a computer program product is also provided, which is tangibly stored on a non-transitory computer readable medium and includes computer-executable instructions that are executed by a processor to implement the method described above.

Aspects of the present disclosure are described herein with reference to flowcharts and/or block diagrams of methods, apparatus, devices and computer program products implemented in accordance with the present disclosure. It should be understood that each block of the flowcharts and/or block diagrams and combinations of blocks in the flowchart and/or block diagrams can be implemented by computer readable program instructions.

These computer readable program instructions may be provided to a processing unit of a general-purpose computer, special purpose computer, or other programmable data processing apparatus to produce a machine, such that the instructions, when executed via the processing unit of the computer or other programmable data processing apparatus, create means for implementing the functions/actions specified in one or more blocks of the flowcharts and/or block diagrams. These computer readable program instructions may also be stored in a computer readable storage medium that can direct a computer, a programmable data processing apparatus, and/or other devices to function in a particular manner, such that the computer readable medium storing the instructions includes an article of manufacture that includes instructions which implement various aspects of the functions/actions specified in one or more blocks of the flowcharts and/or block diagrams.

The computer readable program instructions may be loaded onto a computer, other programmable data processing apparatus, or other devices, causing a series of operational steps to be performed on the computer, other programmable data processing apparatus, or other devices, to produce a computer implemented process such that the instructions, when being executed on the computer, other programmable data processing apparatus, or other devices, implement the functions/actions specified in one or more blocks of the flowchart and/or block diagrams.

The flowcharts and block diagrams in the drawings illustrate the architecture, functionality, and operations of possible implementations of the systems, methods and computer program products according to various implementations of the present disclosure. In this regard, each block in the flowchart or block diagram may represent a module, segment, or portion of instructions which includes one or more executable instructions for implementing the specified logical function(s). In some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

Various implementations of the disclosure have been described as above, the foregoing description is example, not exhaustive, and the present application is not limited to the implementations as disclosed. Many modifications and variations will be apparent to those of ordinary skill in the art without departing from the scope and spirit of the implementations as described. The selection of terms used herein is intended to best explain the principles of the implementations, the practical application, or improvements to technologies in the marketplace, or to enable those skilled in the art to understand the implementations disclosed herein.

We claim:

1. A method for user interaction, comprising:
presenting a page containing a plurality of navigation tabs corresponding to respective sets of content in an application, wherein the plurality of navigation tabs comprise a first navigation tab, wherein the first navigation tab corresponds to a first set of content in the application, wherein the plurality of navigation tabs on the page do not contain an indication indicating whether a respective set of content has a specific attribute, and wherein the specific attribute comprises an attribute indicating that the first set of content is not publicly visible;
receiving a selection of the first navigation tab;
in response to receiving the selection of the first navigation tab and determining that the first set of content has the specific attribute, presenting an indication in the first navigation tab or neighboring the first navigation tab on the page, wherein the indication indicates that the first set of content has the specific attribute;

displaying a plurality of navigation sub-tabs under the first navigation tab, wherein each of the plurality of navigation sub-tabs are selectable to view a subset of the first set of content; and in response to a selection of a navigation sub-tab among the plurality of navigation sub-tabs, presenting the indication in the selected navigation sub-tab while the indication is still presented in the first navigation tab or neighboring the first navigation tab.

2. The method of claim 1, further comprising:

in response to receiving a user selection of a second navigation tab of the plurality of navigation tabs, ceasing to present the indication in the first navigation tab or neighboring the first navigation tab on the page.

3. The method of claim 1, wherein each of the respective sets of content corresponding to the plurality of navigation tabs relates to a category among a first set of categories associated with media content.

4. The method of claim 3, wherein the first set of categories comprises at least one of the following information categories: media content posted by a user, media content that a user likes, and media content favorited by a user.

5. The method of claim 1, wherein each of the respective sets of content corresponding to the plurality of navigation tabs relates to a category among a second set of categories of social relationships between a user and other users.

6. The method of claim 5, wherein the second set of categories comprises at least one of the following information categories: a following of the user, a follower of the user, a friend of the user.

7. The method of claim 1, further comprising:

presenting a textual description of the indication at a predetermined location on the page.

8. An electronic device comprising:

at least one processing unit; and at least one memory coupled to the at least one processing unit and storing instructions for execution by the at least one processing unit, the instructions, when executed by the at least one processing unit, causing the electronic device to perform at least:

presenting a page containing a plurality of navigation tabs corresponding to respective sets of content in an application, wherein the plurality of navigation tabs comprise a first navigation tab, wherein the first navigation tab corresponds to a first set of content in the application, wherein the plurality of navigation tabs on the page do not contain an indication indicating whether a respective set of content has a specific attribute, and wherein the specific attribute comprises an attribute indicating that the first set of content is not publicly visible;

receiving a selection of the first navigation tab;

in response to receiving the selection of the first navigation tab and determining that the first set of content has the specific attribute, presenting an indication in the first navigation tab or neighboring the first navigation tab on the page, wherein the indication indicates that the first set of content has the specific attribute;

displaying a plurality of navigation sub-tabs under the first navigation tab, wherein each of the plurality of navigation sub-tabs are selectable to view a subset of the first set of content; and in response to a selection of a navigation sub-tab among the plurality of navigation sub-tabs, presenting the indication in the selected navigation sub-tab while the indication is still presented in the first navigation tab or neighboring the first navigation tab.

9. The electronic device of claim 8, wherein the electronic device is further caused to perform:

in response to receiving a user selection of a second navigation tab of the plurality of navigation tabs, ceasing to present the indication in the first navigation tab or neighboring the first navigation tab on the page.

10. The electronic device of claim 8, wherein each of the respective sets of content corresponding to the plurality of navigation tabs relates to a category among a first set of categories associated with media content.

11. The electronic device of claim 10, wherein the first set of categories comprises at least one of the following information categories: media content posted by a user, media content that a user likes, and media content favorited by a user.

12. The electronic device of claim 8, wherein each of the respective sets of content corresponding to the plurality of navigation tabs relates to a category among a second set of categories of social relationships between a user and other users.

13. The electronic device of claim 12, wherein the second set of categories comprises at least one of the following information categories: a following of the user, a follower of the user, a friend of the user.

14. The electronic device of claim 8, wherein the electronic device is further caused to perform:

presenting a textual description of the indication at a predetermined location on the page.

15. A non-transitory computer readable storage medium having a computer program stored thereon, the computer program, when executed by a processor, implements a method comprising:

presenting a page containing a plurality of navigation tabs corresponding to respective sets of content in an application, wherein the plurality of navigation tabs comprise a first navigation tab, wherein the first navigation tab corresponds to a first set of content in the application, wherein the plurality of navigation tabs on the page do not contain an indication indicating whether a respective set of content has a specific attribute, and wherein the specific attribute comprises an attribute indicating that the first set of content is not publicly visible;

receiving a selection of the first navigation tab;

in response to receiving the selection of the first navigation tab and determining that the first set of content has the specific attribute, presenting an indication in the first navigation tab or neighboring the first navigation tab on the page, wherein the indication indicates that the first set of content has the specific attribute;

displaying a plurality of navigation sub-tabs under the first navigation tab, wherein each of the plurality of navigation sub-tabs are selectable to view a subset of the first set of content; and in response to a selection of a navigation sub-tab among the plurality of navigation sub-tabs, presenting the indication in the selected navigation sub-tab while the indication is still presented in the first navigation tab or neighboring the first navigation tab.

* * * * *